United States Patent
Kim et al.

(10) Patent No.: US 12,312,460 B2
(45) Date of Patent: May 27, 2025

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Yun Ki Cho, Daejeon (KR); Woo Hyuk Choi, Daejeon (KR); Jeong Ju Moon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 799 days.

(21) Appl. No.: 17/439,700

(22) PCT Filed: Apr. 28, 2020

(86) PCT No.: PCT/KR2020/005567
§ 371 (c)(1),
(2) Date: Sep. 15, 2021

(87) PCT Pub. No.: WO2020/222494
PCT Pub. Date: Nov. 5, 2020

(65) Prior Publication Data
US 2022/0162436 A1 May 26, 2022

(30) Foreign Application Priority Data
May 2, 2019 (KR) .......................... 10-2019-0051715

(51) Int. Cl.
*C08L 27/06* (2006.01)
*C08K 5/12* (2006.01)

(52) U.S. Cl.
CPC ................ *C08L 27/06* (2013.01); *C08K 5/12* (2013.01)

(58) Field of Classification Search
CPC .............................. C08K 5/12; C08K 2201/014
See application file for complete search history.

(56) References Cited

U.S. PATENT DOCUMENTS

| | | | |
|---|---|---|---|
| 7,337,913 B2 * | 3/2008 | Breitscheidel | C08K 5/12 524/297 |
| 7,855,340 B2 | 12/2010 | Gosse et al. | |
| 8,283,411 B2 | 10/2012 | Gosse et al. | |
| 2004/0127609 A1 | 7/2004 | Strand et al. | |
| 2005/0020718 A1 | 1/2005 | Gosse et al. | |
| 2007/0293646 A1 | 12/2007 | Gosse et al. | |
| 2008/0274364 A1 | 11/2008 | Gosse et al. | |
| 2009/0291304 A1 | 11/2009 | Gosse et al. | |
| 2010/0316861 A1 * | 12/2010 | Kubler | C08J 5/18 428/220 |
| 2011/0040001 A1 | 2/2011 | Gosse et al. | |
| 2011/0053065 A1 | 3/2011 | Wu et al. | |
| 2012/0071598 A1 | 3/2012 | Gosse et al. | |
| 2012/0138206 A1 * | 6/2012 | Wagner | C08K 5/12 524/285 |
| 2015/0246867 A1 | 9/2015 | Castiglioni et al. | |
| 2017/0088691 A1 | 3/2017 | Woldt et al. | |
| 2018/0105673 A1 | 4/2018 | Schilling, III et al. | |
| 2018/0319954 A1 | 11/2018 | Woldt et al. | |
| 2019/0047938 A1 | 2/2019 | Kim et al. | |
| 2019/0048167 A1 | 2/2019 | Kim et al. | |
| 2019/0248982 A1 | 8/2019 | Kim et al. | |
| 2019/0248984 A1 | 8/2019 | Kim et al. | |

FOREIGN PATENT DOCUMENTS

| | | | |
|---|---|---|---|
| CN | 102002200 A | 4/2011 | |
| CN | 105037161 A | 11/2015 | |
| CN | 108699286 A | 10/2018 | |
| CN | 109153817 A | 1/2019 | |
| DE | 19832088 A1 | 1/2000 | |
| DE | 20021356 U1 * | 2/2001 | ............. C08K 5/092 |
| EP | 3395873 A1 | 10/2018 | |
| EP | 3530690 A1 | 8/2019 | |
| JP | 2004-026723 A | 1/2004 | |
| JP | 2004323778 A | 11/2004 | |
| JP | 2006-518770 A | 8/2006 | |
| KR | 10-2009-0038514 A | 4/2009 | |
| KR | 10-0957134 B1 | 5/2010 | |
| KR | 10-2016-0047221 A | 5/2016 | |
| KR | 10-2017-0037845 A | 4/2017 | |
| KR | 10-2018-0067435 A | 6/2018 | |
| KR | 10-2018-0080689 A | 7/2018 | |
| WO | 2014/053535 A2 | 4/2014 | |

OTHER PUBLICATIONS

Extended European Search Report of European Patent Office in Appl'n No. 20798264.6, dated May 25, 2022.

* cited by examiner

*Primary Examiner* — Michael M Dollinger
(74) *Attorney, Agent, or Firm* — Bryan Cave Leighton Paisner LLP

(57) ABSTRACT

The present disclosure relates to a plasticizer composition including a cyclohexane 1,4-diester-based material and a cyclohexane 1,2,4-triester-based material, and may provide a plasticizer maintaining an excellent level of plasticization efficiency when compared with a common phthalate-based plasticizer product and improving mechanical properties, and may also provide a plasticizer having excellent stress resistance as an advantage.

10 Claims, No Drawings

PLASTICIZER COMPOSITION AND RESIN COMPOSITION INCLUDING THE SAME

CROSS-REFERENCE TO RELATED APPLICATIONS

The present application is a National Phase entry pursuant to 35 U.S.C. § 371 of International Application No. PCT/KR2020/005567, filed on Apr. 28, 2020, and claims the benefit of and priority to Korean Patent Application No. 10-2019-0051715, filed on May 2, 2019, all of which are hereby incorporated by reference in their entirety for all purposes as if fully set forth herein.

TECHNICAL FIELD

Technical Field

The present invention relates to a plasticizer composition and a resin composition including the same, and relates to a plasticizer composition which is eco-friendly and has excellent physical properties, and a resin composition including the same.

BACKGROUND ART

Generally, plasticizers are obtained through the reaction of alcohols with polycarboxylic acids such as phthalic acid and adipic acid to form corresponding esters. In addition, considering the internal and external regulations on harmful phthalate-based plasticizers to the human body, studies are being continued on plasticizer compositions which may replace phthalate-based plasticizers such as terephthalate-based, adipate-based and other polymer-based plasticizers.

Meanwhile, regardless of the type of industry including plastisol type of industry of flooring materials, wallpaper, soft and hard sheets, etc., calendaring type of industry, extrusion/injection compound type of industry, the demand for eco-friendly products is increasing. In order to reinforce the quality properties, processability and productivity by the finished products, an appropriate plasticizer is required considering discoloration, migration, mechanical properties, etc.

According to the properties required by the types of industry in various areas of usage, such as tensile strength, elongation rate, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, in case of applying di(2-ethylhexyl) terephthalate (DEHTP) which is relatively cheap and widely used among plasticizer compositions which may be applied to PVC, hardness or sol viscosity is high, absorption rate of a plasticizer is relatively slow, and migration and stress migration are not good.

As improvements on the above limitations, the application of a transesterification product with butanol as a plasticizer, as a composition including DEHTP may be considered. In this case, plasticization efficiency is improved but volatile loss or thermal stability is inferior and mechanical properties are somewhat degraded, and the improvement of physical properties is required. Accordingly, there is no solution but employing a method compensating the defects through mixing with a second plasticizer at the present time.

However, in case of applying the second plasticizer, there are drawbacks of generating unexpected defects as follows: the change of the physical properties is hard to predict, the application may become a factor of increasing the unit cost of the product, the improvement of the physical properties is not clearly shown except for specific cases, and problems relating to compatibility with a resin may arise.

In addition, if a material like tri(2-ethylhexyl) trimellitate or triisononyl trimellitate is applied as a trimellitate-based product in order to improve the inferior migration and loss properties of the DEHTP products, migration or loss properties may be improved, but plasticization efficiency may be degraded, and a great deal of the material is required to be injected to provide a resin with suitable plasticization effect, and considering relatively the high unit price of the products, commercialization thereof is impossible.

Further, in order to improve the inferior performance of DEHTP products, the hydrogenated products thereof have been suggested, but the products thus obtained show improved plasticization efficiency but degraded mechanical properties and stress resistance and further deteriorated migration and loss properties, and the issue on the increase of the unit price due to hydrogenation remains.

Accordingly, the development of products for solving the environmental issues of the conventional phthalate-based products or products for improving inferior physical properties of the eco-friendly products for improving the environmental issues of the phthalate-based products is required.

PRIOR ART DOCUMENT

Patent Document (Patent Document 1) KR10-0957134B

DISCLOSURE OF THE INVENTION

Technical Problem

An object of the present invention is to provide a plasticizer composition which is eco-friendly and has excellent physical properties, and a plasticizer composition having improved physical properties such as migration loss, tensile strength and volatile loss and improved elongation rate and stress resistance so as to have excellent directionality.

Technical Solution

To solve the tasks, there is provided in the present invention, a plasticizer composition including: a cyclohexane 1,4-diester-based material as a diester-based material in which the carbon number of alkyl groups bonded to two ester groups is each independently 8 to 10; and a cyclohexane 1,2,4-triester-based material as a triester-based material in which the carbon number of alkyl groups bonded to three ester groups is each independently 4 to 10, wherein a weight ratio of the cyclohexane 1,4-diester-based material and the cyclohexane 1,2,4-triester-based material is 95:5 to 5:95.

In order to solve the tasks, there is provided in the present invention, a resin composition including 100 parts by weight of a resin and 5 to 150 parts by weight of the plasticizer composition.

Advantageous Effects

The plasticizer composition of the present invention is eco-friendly and, if the plasticizer composition of the present invention is included in a resin composition, physical properties such as tensile strength, elongation rate, migration, volatile loss and stress resistance may be markedly improved to an equal or better level of common phthalate products or improved products thereof.

Particularly, migration resistance and volatile loss, which were defects of a cyclohexane 1,4-diester-based material and extremely difficult to improve, could be improved, and compatibility with a resin and plasticization efficiency could be maintained to an excellent level.

MODE FOR CARRYING OUT THE INVENTION

Hereinafter, the present invention will be explained in more detail to assist the understanding of the present invention.

Definition of Terms

The term "composition" as used in the present disclosure includes a mixture of materials including the corresponding composition as well as a reaction product and a decomposition product formed from the materials of the corresponding composition.

The prefix "iso-" as used in the present disclosure means an alkyl group in which a methyl group or an ethyl group is combined as a branched chain with the main chain of the alkyl group, and may be used as a general term of an alkyl group in which a methyl group or an ethyl group is combined as a branched chain with a main chain, unless otherwise no separate alkyl group is present.

The term "isononyl group" used in the present disclosure may mean an alkyl group of total 9 carbon atoms, in which one or more among one or two methyl groups, one ethyl group and one propyl group are substituted at a main chain, for example, a general term of a 2-methyloctyl group, a 3-methyloctyl group, a 4-methyloctyl group, a 5-methyloctyl group, a 6-methyloctyl group, a 3-ethylheptyl group, a 2-ethylheptyl group, a 2,5-dimethylheptyl group, a 2,3-dimethylheptyl group, a 4,5-dimethylheptyl group, a 3-ethyl-4-methylhexyl group, a 2-ethyl-4-methylhexyl group, or a 2-propylhexyl group. A commercially used isononyl alcohol (CAS No.: 68526-84-1, 27458-94-2) may mean a composition of isomers having the degree of branching of 1.2 to 1.9, and the commercial alcohol may also include some n-nonyl group.

The term "straight vinyl chloride polymer" as used in the present disclosure may be one type of vinyl chloride polymers and polymerized by suspension polymerization, bulk polymerization, etc., and may refer to a polymer having a porous particle shape in which a large number of pores having a size of tens to hundreds of micrometers, no cohesiveness, and excellent flowability are dispersed.

The term "paste vinyl chloride polymer" as used in the present disclosure may be one type of vinyl chloride polymers and polymerized by microsuspension polymerization, microseed polymerization, emulsion polymerization, etc., and may refer to a polymer having minute particles without pores and a size of tens to thousands of nanometers, cohesiveness, and inferior flowability.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Methods

In the present disclosure, the content analysis of the components in a composition which is a product of specific reaction, for example, esterification reaction, is conducted by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

In the present disclosure, "hardness" means Shore hardness (Shore "A" and/or Shore "D") at 25° C. and is measured in conditions of 3T 10s using ASTM D2240. The hardness may be an index for evaluating plasticization efficiency, and the lower the value is, the better the plasticization efficiency is.

In the present disclosure, "tensile strength" is obtained according to an ASTM D638 method by drawing a specimen in a cross head speed of 200 mm/min (1T) using a test apparatus of U.T.M (manufacturer: Instron, model name: 4466), measuring a point where the specimen is cut, and calculating according to the following Mathematical Formula 1:

Tensile strength ($kgf/cm^2$)=load value (kgf)/thickness (cm)×width (cm)     [Mathematical Formula 1]

In the present disclosure, "elongation rate" is obtained according to an ASTM D638 method by drawing a specimen in a cross head speed of 200 mm/min (1T) using the U.T.M, measuring a point where the specimen is cut, and calculating according to the following Mathematical Formula 2:

Elongation rate (%)=length after elongation/initial length×100     [Mathematical Formula 2]

In the present disclosure, "migration loss" is obtained according to KSM-3156, by which a specimen with a thickness of 2 mm or more is obtained, glass plates are attached onto both sides of the specimen and a load of 1 $kgf/cm^2$ is applied. The specimen is stood in a hot air circulation type oven (80° C.) for 72 hours, then taken out therefrom and cooled at room temperature for 4 hours. Then, the glass plates attached onto both sides of the specimen are removed, the weights before and after standing in the oven are measured, and the migration loss is calculated according to Mathematical Formula 3 below. Here, the material of the plate may be diverse such as polystyrene (PS), ABS, glass and specimen plate itself, and the material of the plate used for the measurement in the present disclosure is glass.

Migration loss (%)={[(weight of initial specimen)− (weight of specimen after standing in oven)]/ (weight of initial specimen)}×100     [Mathematical Formula 3]

In the present disclosure, "volatile loss" is obtained by processing a specimen at 80° C. for 72 hours and then, measuring the weight of the specimen.

Volatile loss (wt %)={[(weight of initial specimen)− (weight of specimen after processing)]/(weight of initial specimen)}×100     [Mathematical Formula 4]

In case of the various measurement conditions, the details of the conditions of the temperature, the speed of revolution, the time, etc., may be somewhat changed according to situations, and if the conditions are different, a measurement method and its conditions are required to be separately indicated.

Hereinafter, the present invention will be explained in more detail to assist the understanding of the present invention.

It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

The plasticizer composition according to an embodiment of the present invention includes a cyclohexane 1,4-diester-based material and a cyclohexane 1,2,4-triester-based material, wherein the diester-based material is selected from ones in which two alkyl groups bonded to a diester group each independently have 8 to 10 carbon atoms, and the triester-based material is selected from ones in which three alkyl groups bonded to a triester group each independently have 4 to 10 carbon atoms.

The cyclohexane 1,4-diester-based material may include alkyl groups bonded thereto having 8 to 10 carbon atoms, for example, a 2-ethylhexyl group, an isononyl group, an n-nonyl group, a 2-propylheptyl group or an isodecyl group, and preferably, a 2-ethylhexyl group, an isononyl group or a 2-propylheptyl group may be applied. The diester-based material may generally be obtained by the hydrogenation of terephthalate, may be a plasticizer which may replace a terephthalate-based plasticizer, and may have quite excellent plasticization efficiency and light resistance. In view of achieving such effects, the carbon number of the alkyl group may more preferably be 8 or 9.

In addition, the diester-based material is a material in which ester groups are bonded to carbon atoms at position 1 and position 4 of cyclohexane and may be derived from the hydrogenation of terephthalate. Since the diester-based material may have better plasticization efficiency and mechanical properties when compared with materials in which ester groups are bonded at carbon atoms of position 1 and position 2, or ester groups are bonded at carbon atoms of position 1 and position 3, a diester-based material with ester groups at position 1 and position 4 according to the present invention may preferably be applied.

The diester-based material may be prepared by the hydrogenation of a terephthalate-based material, may be prepared through the esterification reaction of cyclohexane dicarboxylic acid, or may be prepared through the suitable combination of hydrogenation and esterification.

In case of directly preparing, the cyclohexane 1,4-diester-based material may be prepared through direct esterification reaction or transesterification reaction of cyclohexane 1,4-dicarboxylic acid or derivatives thereof with an alcohol.

The cyclohexane 1,4-dicarboxylic acid derivative may be one or more selected from the group consisting of an anhydride of cyclohexane 1,4-dicarboxylic acid and/or an alkyl ester of cyclohexane 1,4-dicarboxylic acid. In this case, the alkyl ester may be an alkyl ester of 8 to 10 carbon atoms.

The alkyl group of the cyclohexane 1,4-diester finally prepared has 8 to 10 carbon atoms, and the above-described alkyl group may preferably be applied, and these alkyl groups may be derived from alcohols used during the preparation.

In case where a cyclohexane 1,4-diester-based material is prepared through direct esterification reaction, the alcohol may be used in 2 to 10 mol, 2 to 8 mol, 2 to 6 mol or 2 to 5 mol with respect to 1 mol of the cyclohexane 1,4-dicarboxylic acid or derivatives thereof, and among them, 2 to 5 mol is preferably used.

The direct esterification reaction may be performed in the presence of a catalyst, and the catalyst may be one or more selected from the group consisting of inorganic acids, organic acids and Lewis acids, and may be one or more selected from the group consisting of organic acids and Lewis acids.

The inorganic acid may be one or more selected from the group consisting of sulfuric acid, hydrochloric acid and phosphoric acid.

The organic acid may be one or more selected from the group consisting of p-toluenesulfonic acid, methanesulfonic acid, ethanesulfonic acid, propanesulfonic acid, butanesulfonic acid and alkyl sulfuric acid.

The Lewis acid may be one or more selected from the group consisting of aluminum derivatives (aluminum oxide, aluminum hydroxide), tin derivatives (tin fatty acid ester of $C_3$ to $C_{12}$, tin oxide, tin hydroxide), titanium derivatives (tetraalkyl titanate of $C_3$ to $C_8$, titanium oxide, titanium hydroxide), lead derivatives (lead oxide, lead hydroxide) and zinc derivatives (zinc oxide, zinc hydroxide).

If the catalyst is a homogeneous catalyst, the catalyst may be used in 0.0001 to 5 parts by weight or 0.001 to 3 parts by weight, preferably, 0.01 to 3 parts by weight with respect to 100 parts by weight of the sum of the cyclohexane 1,4-dicarboxylic acid or derivatives thereof with the alcohol.

If the catalyst is a heterogeneous catalyst, the catalyst may be used in 0.5 to 200 parts by weight or 0.5 to 100 parts by weight, preferably, 0.5 to 200 parts by weight with respect to 100 parts by weight of the sum of the cyclohexane 1,4-dicarboxylic acid or derivatives thereof with the alcohol.

The direct esterification reaction may be performed at 100 to 280° C., 130 to 250° C. or 150 to 230° C., preferably, 150 to 230° C.

The direct esterification reaction may be performed for 3 to 30 hours or 3 to 25 hours, preferably, 3 to 25 hours.

Meanwhile, if the cyclohexane 1,4-diester-based material is prepared by the transesterification reaction, the cyclohexane 1,4-diester-based material may be prepared by the transesterification reaction of the derivatives of cyclohexane 1,4-dicarboxylic acid and an alcohol.

The derivative of cyclohexane 1,4-dicarboxylic acid may be the alkyl ester of the cyclohexane 1,4-dicarboxylic acid, and preferably, the methyl ester of the cyclohexane 1,4-dicarboxylic acid may be used for easy separation of reaction products.

With respect to 1 mol of the derivative of cyclohexane 1,4-dicarboxylic acid, 2 to 10 mol, 2 to 8 mol, 2 to 6 mol or 2 to 5 mol of the alcohol may be used, and among them, 2 to 5 mol may preferably be used.

The transesterification reaction may be performed in the presence of a catalyst, and in this case, the reaction time may be reduced.

The catalyst may be one or more selected from the group consisting of Lewis acids and alkali metals.

The Lewis acid may be the same as explained in the direct esterification reaction, and may be one or more selected from the group consisting of aluminum derivatives (aluminum oxide, aluminum hydroxide), tin derivatives (tin fatty acid ester of $C_3$ to $C_{12}$, tin oxide, tin hydroxide), titanium derivatives (tetraalkyl titanate of $C_3$ to $C_8$, titanium oxide, titanium hydroxide), lead derivatives (lead oxide, lead hydroxide) and zinc derivatives (zinc oxide, zinc hydroxide).

In addition, the alkali metal may be one or more selected from the group consisting of sodium alkoxide, potassium alkoxide, sodium hydroxide and potassium hydroxide, and the metal catalyst may be used alone, or a mixture catalyst of two or more thereof may be used.

The catalyst may be used in 0.001 to 5 parts by weight or 0.01 to 3 parts by weight based on 100 parts by weight of the sum of the derivative of cyclohexane 1,4-dicarboxylic acid and the alcohol, and 0.001 to 3 parts by weight is preferably used.

The transesterification reaction may be performed at 120 to 250° C., 135 to 230° C. or 140 to 220° C., and among them, may preferably be performed at 140 to 220° C.

The transesterification reaction may preferably be performed for 0.5 to 10 hours or 0.5 to 8 hours, and among them, may preferably be performed for 0.5 to 8 hours.

In order to promote the release of water or a lower alcohol such as methanol, which is produced by the direct esterification reaction or transesterification reaction, one or more selected from the group consisting of benzene, toluene, xylene and cyclohexane may be additionally injected, and commercially available nitrogen, etc. may be used with the entrainment for the same purpose.

The cyclohexane 1,4-diester-based material, prepared by the direct esterification reaction or transesterification reaction may be separated through another post-treatment. The post-treatment may be one or more selected from the group consisting of the inactivation of the catalyst (neutralization treatment, alkaline treatment), washing treatment, distillation (under a reduced pressure or dehydration treatment) and absorption separation treatment.

Different from the aforementioned preparation method, a preparation method including a step of performing hydrogenation reaction of a dialkyl terephthalate-based material in the presence of a metal catalyst may be applied to transform into a cyclohexane 1,4-diester-based material.

The hydrogenation reaction step is reaction for removing the aromaticity of the benzene ring of terephthalate by adding hydrogen and may be a type of reduction reaction and is a type of reduction reaction.

The hydrogenation reaction is for synthesizing a cyclohexane 1,4-diester-based material by reacting the terephthalate-based material and hydrogen in the presence of a metal catalyst, and the reaction conditions may include all common reaction conditions which may hydrogenate only a benzene ring without affecting a carbonyl group which is substituted at benzene.

The hydrogenation reaction may be performed by further including an organic solvent such as ethanol, without limitation. The metal catalyst may use a Rh/C catalyst, a Pt catalyst, a Pd catalyst, etc., commonly used for hydrogenating a benzene ring, but any one capable of undergoing the above-described hydrogenation reaction may be used without limitation.

The plasticizer composition according to an embodiment of the present invention is characterized in additionally mixing and using a cyclohexane 1,2,4-triester-based material with the cyclohexane 1,4-diester-based material.

Meanwhile, the diester-based material is a material applied for improving the plasticization efficiency of the terephthalate-based material, but despite the improvement of the plasticization efficiency, migration, volatile loss, etc. may be degraded to an equal or lower degree when compared with those of a terephthalate-based plasticizer, and the supplement of such degraded physical properties is difficult, and the diester-based material is difficult to commercialize as a plasticizer satisfying practical needs of the market. Also, though the terephthalate-based plasticizer is an eco-friendly alternative product of the phthalate-based plasticizer, due to the inclusion of a benzene ring, there are limitations of not breaking from a petroleum-based plasticizer. Further, the diester-based material has no markedly improved physical properties which may compensate the increasing cost due to the hydrogenation of the terephthalate-based material and the single use thereof is difficult, and accordingly, blending with other materials to suitably compensate or improve physical properties is required.

If the diester-based material is mixed with terephthalate, the improving effects of physical properties could not be shown except for unit price competitiveness, and in addition, the supplement of degraded mechanical properties is significantly difficult. However, the plasticizer composition according to the present invention uses cyclohexane 1,2,4-triester as the triester-based material and as a blending partner material of the diester-based material, it could be confirmed that the improvement of such physical properties may become possible.

In such a cyclohexane 1,2,4-triester-based material, each alkyl group bonded to three ester groups may be each independently selected from alkyl groups of 4 to 10 carbon atoms, preferably, alkyl groups of 5 to 9 carbon atoms. If a triester-based material with an alkyl group having less than 4 carbon atoms is applied, the accomplishment of the purpose for supplementing mechanical properties may become impossible, and if an alkyl group having greater than 10 carbon atoms is applied, even the excellent plasticization efficiency may be offset.

In order to prevent such defects and to maximize effects, preferable carbon number of the alkyl group may be 5 to 9, and for example, an n-pentyl group, an isopentyl group, an n-hexyl group, an isohexyl group, an n-heptyl group, an isoheptyl group, a 2-ethylhexyl group, an isononyl group or a 2-propylheptyl group may be applied.

According to an embodiment of the present invention, the cyclohexane 1,2,4-triester-based material may be prepared by the hydrogenation reaction of trimellitate, or may be prepared by the transesterification reaction or direct esterification reaction of cyclohexane tricarboxylic acid, and if the order of esterification reaction and hydrogenation reaction is suitably combined, and accordingly, suitable raw materials are applied, a cyclohexane 1,2,4-triester-based material may be prepared. Substantially the same method as the aforementioned preparation of the diester-based material may be applied to this preparation method, and only if the raw material, reaction temperature, etc. may be minutely controlled, the cyclohexane 1,2,4-triester-based material may be obtained without difficulty.

According to an embodiment of the present invention, the diester-based material and the triester-based material may be included in a weight ratio of 95:5 to 5:95. The weight ratio may be, for example, as an upper limit, 99:1, 95:5, 90:10, 85:15, 80:20, 75:25, 70:30, or 60:40, and as a lower limit, 1:99, 5:95, 10:90, 15:85, 20:80, 25:75, 30:70, 40:60 or 50:50. However, for the optimization of the aforementioned effects, a weight ratio of 90:10 to 10:90, preferably, a weight ratio of 80:20 to 20:80 may be applied, and more preferably, a weight ratio of 70:30 to 30:70 may be applied.

As in the present invention, if the cyclohexane 1,4-diester-based material and the cyclohexane 1,2,4-triester-based material are mixed and used, excellent physical properties of each material may be maintained, and synergistic effects of improving inferior physical properties may be shown. Particularly, the improvement of mechanical properties such as tensile strength and elongation rate may be striking, the excellent plasticization efficiency may be maintained, migration and volatile loss may also be achieved to quite excellent degrees, and excellent effects on the improvement of stress resistance may be anticipated.

The resin composition according to another embodiment of the present invention includes 100 parts by weight of a resin, and 5 to 150 parts by weight of the aforementioned plasticizer composition. The plasticizer composition may be included in 5 to 150 parts by weight, preferably, 5 to 130 parts by weight, or 10 to 120 parts by weight based on 100 parts by weight of the resin.

The resin may use common resins well-known in the art. For example, a mixture of one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, synthetic rubber and thermoplastic elastomer may be used, without limitation.

Generally, the resin using the plasticizer composition may be prepared into a resin product through a melt processing or a plastisol processing, and a resin by the melt processing and a resin from the plastisol processing may be produced differently according to each polymerization method.

For example, in case of using a vinyl chloride polymer in a melt processing, solid phase resin particles having a large average particle diameter are prepared by suspension polymerization, or the like and used, and the vinyl chloride polymer is referred to as a straight vinyl chloride polymer. In case of using a vinyl chloride polymer in a plastisol processing, a sol state resin as minute resin particles is prepared by emulsion polymerization, or the like and used, and this vinyl chloride polymer is referred to as a paste vinyl chloride resin.

In this case, in case of the straight vinyl chloride polymer, a plasticizer may preferably be included in a range of 5 to 80 parts by weight with respect to 100 parts by weight of the polymer, and in case of the paste vinyl chloride polymer, the plasticizer may be included in a range of 40 to 120 parts by weight with respect to 100 parts by weight of the polymer.

The resin composition may further include a filler.

The filler may be 0 to 300 parts by weight, preferably, 50 to 200 parts by weight, more preferably, 100 to 200 parts by weight based on 100 parts by weight of the resin.

The plasticizer composition according to an embodiment of the present invention may preferably be applied to a straight vinyl chloride polymer, and accordingly may be melt processed, and may be used as a plasticizer in resin products applied for the processing of calendaring, extrusion, injection, etc., which are processing methods explained later.

The filler may use fillers well-known in the art and is not specifically limited. For example, the filler may be a mixture of one or more types selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer as necessary. Each of the other additives such as the stabilizer may be, for example, 0 to 20 parts by weight, preferably, 1 to 15 parts by weight based on 100 parts by weight of the resin.

The stabilizer may use, for example a calcium-zinc-based (Ca—Zn-based) stabilizer such as a composite stearate of calcium-zinc and barium-zinc-based (Ba—Zn-based) stabilizer using barium-zinc as main metal materials, but is not specifically limited.

The resin composition may be applied to both a melt processing and a plastisol processing as described above, and a calendaring processing, an extrusion processing, or an injection processing may be applied to the melt processing, and a coating processing, or the like may be applied to the plastisol processing.

The resin composition may be used for the manufacture of wires, flooring materials, automobile interior materials, films, sheets or tubes.

Hereinafter, embodiments of the present invention will be explained in detail so that a person skilled in the art may easily perform. The present invention may, however, be embodied in different forms and should not be construed as limited to the embodiments set forth herein.

Preparation Example 1: di(2-ethylhexyl) cyclohexane 1,4-diester (1,4-DEHCH)

To a four-neck, 3 liter reactor equipped with a cooler, a condenser, a decanter, a reflux pump, a temperature controller and a stirrer, 516.5 g of cyclohexane 1,4-dicarboxylic acid, 1.170 g of 2-ethylhexyl alcohol and 1.55 g of a tetraisopropyl titanate catalyst were injected, the reaction temperature was set to 230° C., and direct esterification reaction was performed for about 6 hours while continuously injecting a nitrogen gas. The reaction was finished when an acid value reached 0.1.

After finishing the reaction, extractive distillation was performed under a reduced pressure to remove unreacted raw materials. After the extractive distillation, a neutralization process, a dehydration process and a filtering process were performed to prepare 1,155 g (yield: 97%) of di(2-ethylhexyl) cyclohexane 1,4-dicarboxylate.

Preparation Example 2: diisononyl cyclohexane 1,4-diester (1,4-DINCH)

Diisononyl cyclohexane 1,4-dicarboxylate was prepared by the same method as in Preparation Example 1 except for using isononyl alcohol instead of 2-ethylhexyl alcohol in Preparation Example 1.

Preparation Example 3: di(2-propylheptyl) cyclohexane 1,4-diester (1,4-DPHCH)

Di(2-propylheptyl) cyclohexane 1,4-dicarboxylate was prepared by the same method as in Preparation Example 1 except for using 2-propylheptyl alcohol instead of 2-ethylhexyl alcohol in Preparation Example 1.

Preparation Example 4: diisodecyl cyclohexane 1,4-diester (1,4-DIDCH)

Diisodecyl cyclohexane 1,4-dicarboxylate was prepared by the same method as in Preparation Example 1 except for using isodecyl alcohol instead of 2-ethylhexyl alcohol in Preparation Example 1.

Preparation Example 5: a tri(2-ethylhexyl) cyclohexane 1,2,4-triester-Based Material (1,2,4-TEHCH)

To a four-neck, 3 liter reactor equipped with a cooler, a condenser, a decanter, a reflux pump, a temperature controller and a stirrer, 432.4 g of cyclohexane 1,2,4-tricarboxylic acid, 1014 g of 2-ethylhexyl alcohol and 1.55 g of an isopropyl titanate catalyst were injected, the reaction temperature was set to 230° C., and direct esterification reaction was performed for about 6 hours while continuously injecting a nitrogen gas. The reaction was finished when an acid value reached 0.1.

After finishing the reaction, extractive distillation was performed under a reduced pressure to remove unreacted raw materials. After the extractive distillation, a neutralization process, a dehydration process and a filtering process were performed to prepare 1,072 g (yield: 97%) of tri(2-ethylhexyl) cyclohexane 1,4-tricarboxylate.

Preparation Example 6: a tripentyl cyclohexane 1,2,4-triester-Based Material (1,2,4-TPCH)

Tripentyl cyclohexane 1,4-tricarboxylate was prepared by the same method as in Preparation Example 5 except for using n-pentyl alcohol instead of 2-ethylhexyl alcohol in Preparation Example 5.

Preparation Example 7: a triisononyl cyclohexane 1,2,4-triester-Based Material (1,2,4-TINCH)

Triisononyl cyclohexane 1,4-tricarboxylate was prepared by the same method as in Preparation Example 5 except for using isononyl alcohol instead of 2-ethylhexyl alcohol in Preparation Example 5.

Preparation Example 8: a tributyl cyclohexane 1,2,4-triester-Based Material (1,2,4-TBCH)

Tributyl cyclohexane 1,4-tricarboxylate was prepared by the same method as in Preparation Example 5 except for using n-butyl alcohol instead of 2-ethylhexyl alcohol in Preparation Example 5.

Preparation Example 9: a tri(2-propylheptyl) cyclohexane 1,2,4-triester-Based Material (1,2,4-TPHCH)

Tri(2-propylheptyl) cyclohexane 1,4-tricarboxylate was prepared by the same method as in Preparation Example 5 except for using 2-propylheptyl alcohol instead of 2-ethylhexyl alcohol in Preparation Example 5.

EXAMPLES AND COMPARATIVE EXAMPLES

Plasticizer compositions of Examples and Comparative Examples were prepared using the materials prepared in the Preparation Examples, and the materials are summarized in Table 1 below. The evaluation of the physical properties of the plasticizer compositions were performed according to the experimental items below. Materials other than the materials prepared in the Preparation Examples used were commercial products.

TABLE 1

|  | 1,4-Diester | 1,2,4-Triester | Others |
|---|---|---|---|
| Example 1 | DEHCH 10 1) | TEHCH 90 | — |
| Example 2 | DEHCH 30 | TEHCH 70 | — |
| Example 3 | DEHCH 50 | TEHCH 50 | — |
| Example 4 | DEHCH 70 | TEHCH 30 | — |
| Example 5 | DEHCH 90 | TEHCH 10 | — |
| Example 6 | DINCH 70 | TPCH 30 | — |
| Example 7 | DEHCH 80 | TINCH 20 | — |
| Example 8 | DEHCH 40 | TBCH 60 | — |
| Example 9 | DEHCH 50 | TPHCH 50 | — |
| Example 10 | DPHCH 80 | TINCH 20 | — |
| Example 11 | DIDCH 90 | TEHCH 10 | — |
| Comparative Example 1 | — | — | DINP 100 2) |
| Comparative Example 2 | — | — | DEHTP 100 3) |
| Comparative Example 3 | — | — | TEHTM 100 4) |
| Comparative Example 4 | DEHCH 100 | — | — |
| Comparative Example 5 | — | TEHCH 100 | — |
| Comparative Example 6 | DINCH 100 | — | — |
| Comparative Example 7 | — | TPCH 100 | — |
| Comparative Example 8 | DEHCH 50 | — | DEHTP 50 |
| Comparative Example 9 | DEHCH 50 | — | TEHTM 50 |
| Comparative Example 10 | DHxCH 50 5) | TEHCH 50 | — |

1) The contents in Table 1 are all wt %.
2) DINP: diisononyl phthalate
3) DEHTP: di(2-ethylhexyl) terephthalate
4) TEHTM: tri(2-ethylhexyl) trimellitate
5) DHxCH: dihexyl cyclohexane-1,4-dicarboxylate

Experimental Example 1: Evaluation of Sheet Performance

By using the plasticizers of the Examples and the Comparative Examples, specimens were manufactured according to ASTM D638 and the prescription and manufacturing conditions below.
(1) Prescription
100 parts by weight of a straight vinyl chloride polymer (LS100S, LG Chem), 40 parts by weight of a plasticizer and 3 parts by weight of a stabilizer (BZ-153T)
(2) Mixing:
mixing at 98° C. in 700 rpm
(3) Manufacture of Specimen:
1T and 3T sheets were manufactured by processing at 160° C. for 4 minutes by a roll mill, and at 180° C. for 2.5 minutes (low pressure) and 2 minutes (high pressure) by a press
(4) Test Items
1) Hardness: Shore hardness (Shore "A" and "D") at 25° C. was measured using a 3T specimen for 10 seconds using ASTM D2240. The plasticization efficiency was assessed excellent if the value was small.
2) Tensile strength: By an ASTM D638 method, a specimen was drawn in a cross-head speed of 200 mm/min using a test apparatus of U.T.M (manufacturer: Instron, model name: 4466), and a point where the 1T specimen was cut was measured. The tensile strength was calculated as follows.

$$\text{Tensile strength (kgf/cm}^2\text{)} = \text{load value (kgf)/thickness (cm)} \times \text{width (cm)}$$

3) Elongation rate: By an ASTM D638 method, a specimen was drawn in a cross-head speed of 200 mm/min using a test apparatus of U.T.M, and a point where the 1T specimen was cut was measured. The elongation rate was calculated as follows.

Elongation rate (%)=length after elongation/initial length×100

4) Migration loss measurement: According to KSM-3156, a specimen with a thickness of 1 mm was obtained, glass plates were attached onto both sides of the specimen, and a load of 1 kgf/cm² was applied. The specimen was stood in a hot air circulation type oven (80° C.) for 72 hours and then taken out and cooled at room temperature for 4 hours. Then, the weights of the specimen from which glass plates attached onto both sides thereof were removed, were measured before and after standing in the oven, and the migration loss was calculated as follows.

Migration loss (%)={[(weight of initial specimen)−(weight of specimen after standing in oven)]/(weight of initial specimen)}×100

5) Volatile loss: The specimen manufactured was processed at 113° C. for 72 hours, and the weight of the specimen was measured.

Volatile loss (wt %)={[(weight of initial specimen)−(weight of specimen after processing)]/(weight of initial specimen)}×100

6) Stress test (stress resistance): A specimen with a thickness of 2 mm in a bent state was stood at 23° C. for 72 hours, and the degree of migration (degree of oozing) was observed. The results were recorded as numerical values, and excellent properties were shown if the quantity was closer to 0.

(5) Evaluation Results

The evaluation results on the test items are listed in Table 2 below.

TABLE 2

| Division | Hardness Shore A | Hardness Shore D | Tensile strength (kgf/cm²) | Elongation rate (%) | Migration loss (%) | Volatile loss (%) | Stress resistance |
|---|---|---|---|---|---|---|---|
| Example 1 | 93.1 | 46.5 | 232.9 | 318.7 | 1.82 | 0.49 | 0 |
| Example 2 | 92.5 | 45.9 | 230.8 | 318.3 | 2.29 | 0.65 | 0 |
| Example 3 | 92.2 | 45.5 | 232.4 | 319.1 | 2.36 | 0.81 | 0 |
| Example 4 | 90.9 | 45.0 | 235.5 | 315.4 | 2.86 | 1.05 | 0 |
| Example 5 | 90.1 | 44.8 | 234.6 | 310.1 | 2.98 | 1.17 | 0 |
| Example 6 | 92.3 | 45.6 | 234.7 | 325.4 | 2.35 | 0.70 | 0 |
| Example 7 | 90.3 | 45.0 | 245.1 | 320.2 | 1.95 | 0.95 | 0 |
| Example 8 | 87.8 | 42.2 | 238.9 | 301.0 | 2.34 | 2.14 | 0 |
| Example 9 | 93.3 | 46.8 | 241.0 | 310.5 | 2.23 | 0.56 | 0.5 |
| Example 10 | 94.5 | 47.9 | 240.7 | 298.6 | 3.01 | 1.02 | 1.0 |
| Example 11 | 94.2 | 47.5 | 245.3 | 302.1 | 2.90 | 0.45 | 0.5 |
| Comparative Example 1 | 92.1 | 45.9 | 226.8 | 289.6 | 3.24 | 1.47 | 0.5 |
| Comparative Example 2 | 93.4 | 46.7 | 234.0 | 303.2 | 4.23 | 1.38 | 1.5 |
| Comparative Example 3 | 95.2 | 47.8 | 227.6 | 305.7 | 1.78 | 0.52 | 0.5 |
| Comparative Example 4 | 89.7 | 44.5 | 214.0 | 297.4 | 4.20 | 2.47 | 2 |
| Comparative Example 5 | 94.2 | 47.9 | 215.6 | 301.2 | 1.80 | 0.60 | 0.5 |
| Comparative Example 6 | 92.0 | 45.7 | 209.4 | 274.6 | 3.68 | 1.85 | 2 |
| Comparative Example 7 | 90.5 | 45.1 | 198.6 | 257.4 | 1.23 | 1.30 | 0 |
| Comparative Example 8 | 92.3 | 45.7 | 220.3 | 298.1 | 4.22 | 2.03 | 2 |
| Comparative Example 9 | 93.0 | 46.2 | 220.3 | 301.2 | 3.65 | 2.01 | 1.5 |
| Comparative Example 10 | 87.9 | 42.3 | 220.4 | 287.6 | 2.02 | 4.58 | 1.5 |

Referring to Table 2, it could be confirmed that Examples 1 to 11 in which the plasticizer compositions according to embodiments of the present invention were applied showed significantly improved mechanical properties, and stress resistance was also markedly improved while maintaining the excellence of plasticization efficiency when compared with Comparative Example 1 which used DINP as the conventional product.

In addition, Comparative Examples 2 and 4 are cases where mixing was not performed different from the Examples, and it could be confirmed that Comparative Example 2 showed high hardness, inferior plasticization efficiency, not good mechanical properties such as elongation rate, migration, etc., and inferior stress resistance, and Comparative Example 4 showed improved plasticization efficiency but could be confirmed that other technical characteristics were all inferior, and accordingly, the commercialization by themselves might be difficult. In addition, Comparative Example 8 is a case of mixing the materials of Comparative Examples 2 and 4, and the physical properties thereof showed somewhat intermediate values, but stress resistance was worsened, and migration loss showed no improvement at all.

On the contrary, it could be confirmed that Examples 1 to 5 maintained most of the excellent physical properties of 1,4-DEHCH and improved mechanical properties which could not be improved through 1,4-DEHCH, DEHTP, or a mixture plasticizer thereof. Excellent physical properties may be selectively shown by the mutual synergistic effects, and further, unexpected improvements were found. In addition, it could be verified through Comparative Example 9 that such improvements could not be shown by adding a trimellitate-based material.

The invention claimed is:

1. A resin composition, comprising:
   100 parts by weight of a resin; and
   5 to 150 parts by weight of a plasticizer composition,
   wherein the plasticizer composition comprises:
     a cyclohexane 1,4-diester-based material as a diester-based material in which the carbon number of alkyl groups bonded to two ester groups is each independently 8 to 10; and
     a cyclohexane 1,2,4-triester-based material as a triester-based material in which the carbon number of alkyl groups bonded to three ester groups is each independently 4 to 10,
   wherein a weight ratio of the cyclohexane 1,4-diester-based material and the cyclohexane 1,2,4-triester-based material is 95:5 to 5:95, and
   wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, natural rubber, synthetic rubber and thermoplastic elastomer.

2. The resin composition according to claim 1, wherein a weight ratio of the cyclohexane 1,4-diester-based material and the cyclohexane 1,2,4-triester-based material is 90:10 to 10:90.

3. The resin composition according to claim 1, wherein a weight ratio of the cyclohexane 1,4-diester-based material and the cyclohexane 1,2,4-triester-based material is 80:20 to 20:80.

4. The resin composition according to claim 1, wherein the alkyl groups bonded to three ester groups in the cyclohexane 1,2,4-triester-based material are each independently selected from alkyl groups having 5 to 9 carbon atoms.

5. The resin composition according to claim 1, wherein the alkyl groups bonded to three ester groups in the cyclohexane 1,2,4-triester-based material are each independently selected from the group consisting of a n-pentyl group, an isopentyl group, an n-hexyl group, an isohexyl group, an n-heptyl group, an isoheptyl group, a 2-ethylhexyl group, an isononyl group and a 2-propylheptyl group.

6. The resin composition according to claim 1, wherein the alkyl groups bonded to two ester groups in the cyclohexane 1,4-diester-based material are each independently selected from the group consisting of a 2-ethylhexyl group, an isononyl group and a 2-propylheptyl group.

7. The resin composition according to claim 1, wherein the cyclohexane 1,4-diester-based material comprises one or more selected from the group consisting of di(2-ethylhexyl) cyclohexane 1,4-diester and diisononyl cyclohexane 1,4-diester.

8. The resin composition according to claim 1, wherein the cyclohexane 1,2,4-triester-based material comprises one or more selected from the group consisting of triisopentyl cyclohexane 1,2,4-triester, triisohexyl 1,2,4-triester, triisoheptyl cyclohexane 1,2,4-triester, tri (2-ethylhexyl) cyclohexane 1,2,4-triester, triisononyl cyclohexane 1,2,4-triester and tri (2-propylheptyl) cyclohexane 1,2,4-triester.

9. The resin composition according to claim 1, wherein the cyclohexane 1,4-diester-based material comprises di(2-ethylhexyl) cyclohexane 1,4-diester, and the cyclohexane 1,2,4-triester-based material comprises tri (2-ethylhexyl) cyclohexane 1,2,4-triester.

10. The resin composition according to claim 1, wherein the cyclohexane 1,4-diester-based material comprises diisononyl cyclohexane 1,4-diester, and the cyclohexane 1,2,4-triester-based material comprises triisononyl cyclohexane 1,2,4-triester.

* * * * *